United States Patent [19]

Jarvis et al.

[11] Patent Number: 4,759,390
[45] Date of Patent: Jul. 26, 1988

[54] COATED METAL PIPE HAVING BENDING CAPABILITY

[75] Inventors: Harold F. Jarvis, Moffat; Frederick S. Gelfant, Thornhill, both of Canada

[73] Assignee: Shaw Industries Ltd., Ontario, Canada

[21] Appl. No.: 934,840

[22] Filed: Nov. 25, 1986

[51] Int. Cl.⁴ .................................. F16L 9/16
[52] U.S. Cl. .................... 138/175; 138/145; 138/146
[58] Field of Search ............... 138/129, 131, 132, 133, 138/137, 139, 143, 144, 145, 146, 150, 154, 172, 174, 175, 176, DIG. 6

[56] References Cited

U.S. PATENT DOCUMENTS 4,241,762 12/1980 Link et al. ......................... 138/145
4,611,635  9/1986 Jarvis ................................. 138/146

Primary Examiner—James E. Bryant, III
Attorney, Agent, or Firm—G. P. Orleans

[57] ABSTRACT

In a concrete-wrapped pipe having an inner water-impermeable resinous coating, the concrete wrapping is formed with a continuous inner portion covering the resinous coating and a helically slotted outer portion, the helical slot extending at least to the depth of a mesh reinforcement embedded in the concrete. The structure is characterized by the fact that the inner portion of the concrete wrapping is formed with one or more helically extending zones of reduced compressive strength, radially aligned with the helical slot or slots in the outer portion. The helical configuration breaks the continuity of the concrete wrapping in the longitudinal direction of the pipe and, even with pipe of relatively large diameter, enables the wrapping to accommodate limited bending of the pipe.

8 Claims, 5 Drawing Sheets

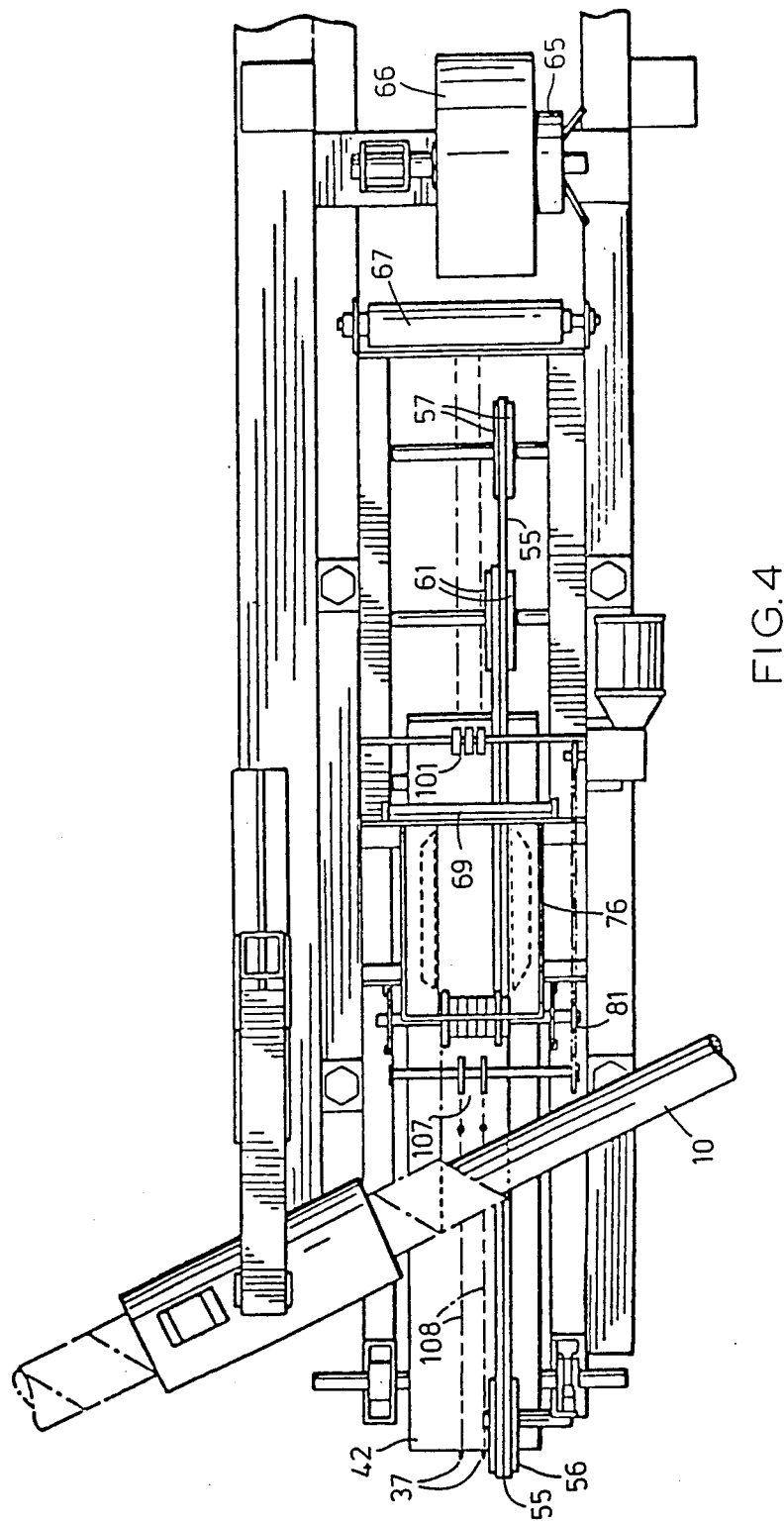

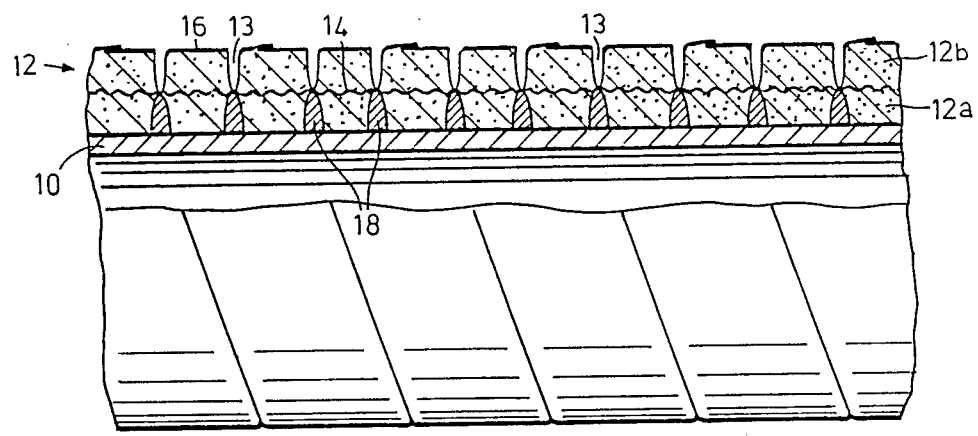
FIG. 6
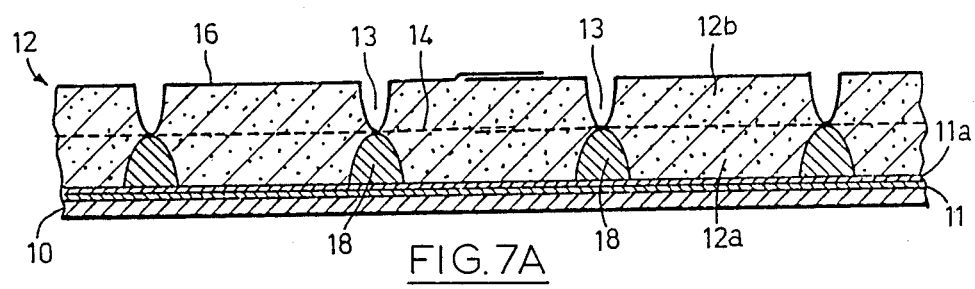
FIG. 7A
FIG. 7B
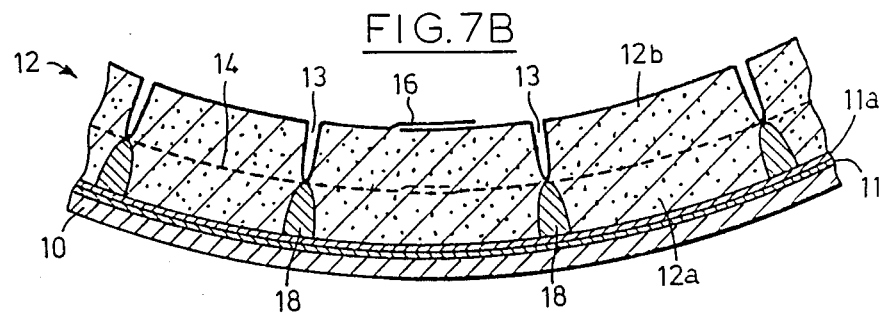
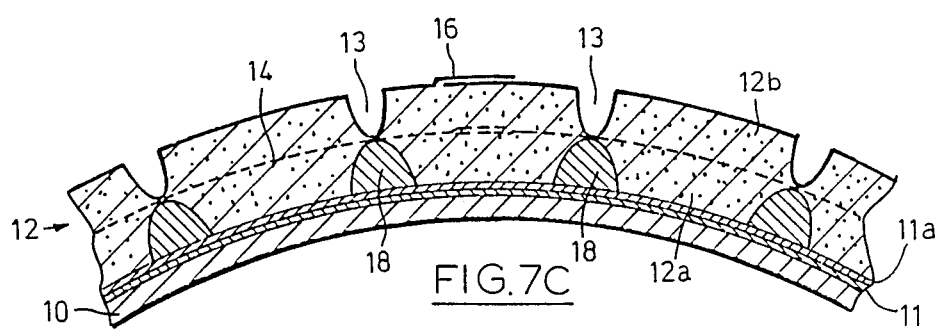
FIG. 7C

COATED METAL PIPE HAVING BENDING CAPABILITY

This invention relates to metal pipes, more particularly metal pipes used in pipeline applications.

Pipes to be installed in pipelines are commonly coated with a corrosion barrier layer, for example a thin resinous layer which is bonded to the pipe surface and, so long as it remains intact, serves as a water barrier to protect the pipe against corrosion, although in practice it is usual to provide further protection against corrosion by a system of cathodic protection. In the installation of a pipeline both the pipe and the thin resinous layer are susceptible to mechanical damage caused by impact of rocks during lowering and backfilling, and denting by rocks due to the high static loading during hydrostatic testing operations. To prevent such damage there is a great need in the pipeline industry for a protective coating which will absorb impact and diffuse penetration loads likely to cause damage. Currently available materials which are used on a small scale for this purpose include particle board, which can withstand impact up to about 60 Joules, and fibre-reinforced cement, which can withstand impact up to about 20 Joules. However, these materials are not suitable for pipeline applications in rocky terrain where much greater mechanical protection is required.

One of the difficulties in making a suitable selection from the available materials is that the material must not only have the requisite impact and penetration resistance but must also have sufficient flexibility to accommodate bending of the pipe up to a certain amount typically 1.5° per pipe diameter permanent deflection.

In order to avoid damage to the pipe, as well as the coating, from rocks, particularly where a pipe is to be buried in a rocky terrain, the common practice is to truck sand from other areas and to embed the pipe in the sand at a level elevated from the rocky base. This is a very costly procedure which can be obviated by the use of a suitably structured coating.

One such coating, as applied to a metal pipe, is described in U.S. Pat. No. 4,611,635, Harold F. Jarvis. The coating essentially consists of a water-permeable layer of impact-resistant and penetration-resistant cladding material structured in such a way as to accommodate limited bending of the pipe.

The cladding material may be concrete, but other materials having the requisite impact resistance, penetration resistance and permeability to water may also be used. The relevant criteria of such a material for use in pipeline applications are as follows:

| | |
|---|---|
| Minimum Compressive Strength | 17 MPa |
| Maximum Elongation | 2.2% |
| Minimum Impact Resistance (measured with a 25 mm diameter tup with a 10 Kg weight) | 450 Joules |
| Minimum Penetration Resistance (measured with a 25 mm diameter blunt rod) | 2500 Kg. |

The volume resistivity of the material when saturated with water should be less than five times the volume resistivity of water, and freeze-thaw cycling should have no effect.

The coating of cladding material described in U.S. Pat. No. 4,611,635 is primarily intended for pipe of relatively small diameter, up to about 18 inches. However, with pipe of larger diameter such a coating in practice offers resistance to bending of the pipe and tends to act as a rigid jacket, the rigidity increasing with pipe diameter. The present invention overcomes this limitation by providing a coating of inherently rigid cladding material having a novel structural configuration which enables it to accommodate limited bending of the pipe to which it is applied, even though the pipe be of relatively large diameter.

Concrete-coated metal pipes are well known in the art. Canadian Pat. Nos. 959744 and 1076343 relate to methods and apparatus for applying concrete coatings to pipes. These coatings are usually applied to pipes intended for offshore installations where weight and negative buoyancy are the major considerations, but are generally unsuitable for inland installations owing to the rigidity of the product and therefore its inability to accommodate bending of the pipe as it is laid. The present invention provides a protective coating which does not have these limitations and which is especially suitable for inland pipeline installations.

According to one aspect of the present invention there is provided a metallic pipe having a protective coating consisting essentially of an inner, water-impermeable corrosion barrier layer bonded to the pipe surface and an outer, water-permeable layer of impact-resistant and penetration-resistant cladding material, said cladding material having a layer of mesh reinforcing material embedded therein defining inner and outer layer portions, characterized in this, that said outer layer portion is helically slotted substantially to the depth of said reinforcing layer, and said inner layer portion incorporates a helically extending zone of reduced compressive strength, said helically extending zone extending substantially to the reinforcing layer and being radially aligned with the helical slot of said outer layer portion throughout its length.

The layer of cladding material is preferably formed as a continuous strip of concrete incorporating the mesh reinforcing material and having complementary rebated edges defining laterally offset inner and outer strip portions, the strip being wrapped helically onto the pipe with the rebated edges of adjacent convolutions merging to form the continuous concrete layer. In a preferred method of applying the coating, the concrete strip is supported on a carrier tape which is fed to the pipe under tension and helically wrapped around the pipe so as to compress the concrete on it. The tape is of such a width as to extend beyond one rebated edge of the concrete strip.

The concrete layer may be of high density concrete, but for inland installations it is preferably of lightweight concrete for convenience of shipping and handling of the coated pipe sections.

A preferred embodiment of the invention will now be described, by way of example, with reference to the accompanying drawings, in which:

FIG. 1A is a section on line A—A in FIG. 1;

FIG. 1B is a section on line B—B in FIG. 1;

FIG. 4 is a top plan view of the apparatus;

FIG. 6 is a half-sectional side elevation of a pipe having a protective coating according to the invention;

FIG. 7A is a longitudinal sectional view showing the configuration of the concrete layer before the pipe is subjected to bending;

FIG. 7B is a view corresponding to FIG. 7A but showing the configuration of the concrete layer when the pipe is subjected to bending in one direction, the section being taken on the inner side of the bend;

FIG. 7C is a view corresponding to FIG. 7B but showing the configuration of the concrete layer when the pipe is subjected to bending in the opposite direction, the section being taken on the outer side of the bend.

Figure 1:
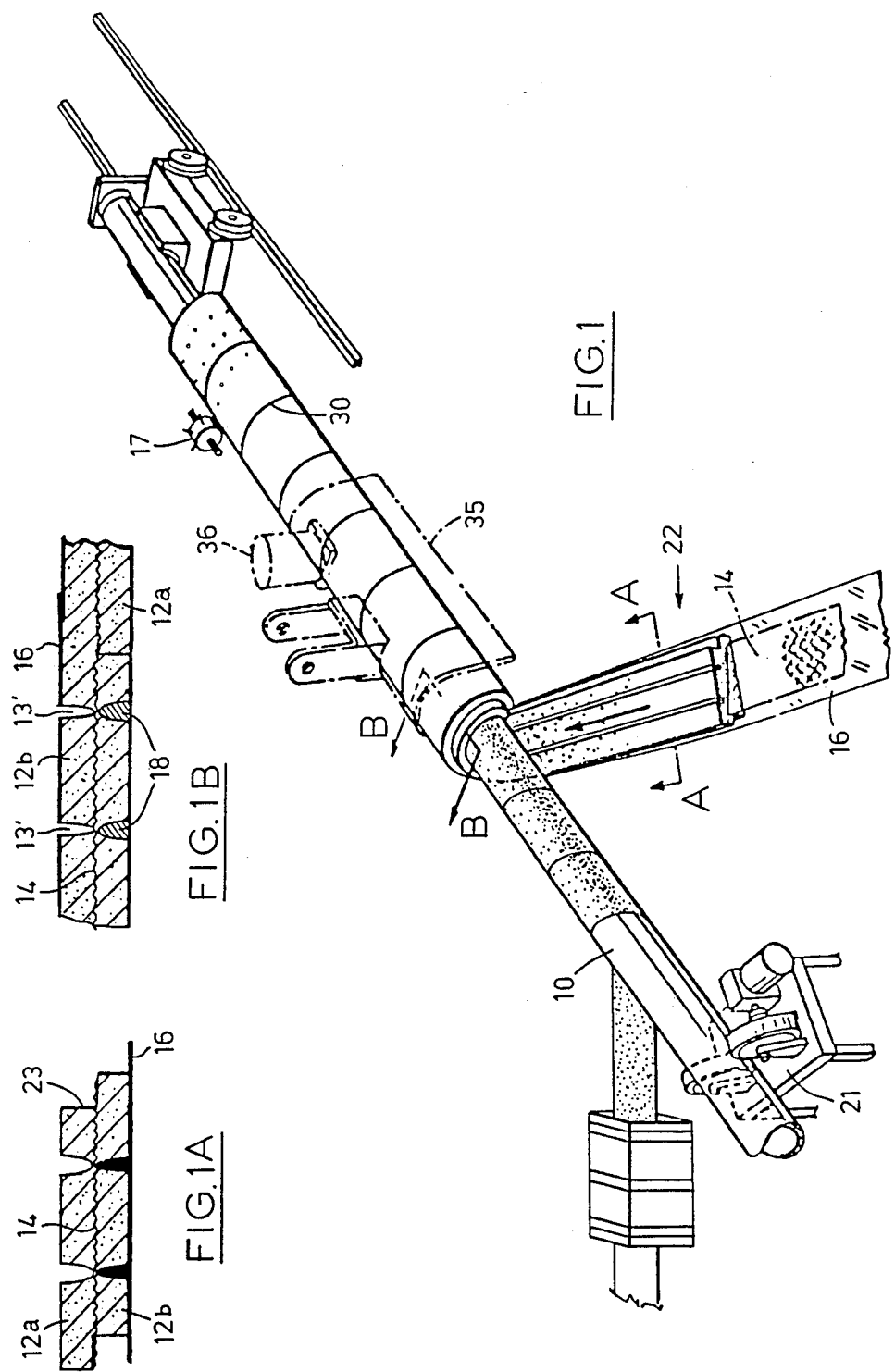
FIG. 1 is a perspective view of a pipe being wrapped in accordance with a method of the invention.

The method and apparatus illustrated in FIGS. 1 to 5, for applying the concrete layer to the pipe will be described hereinafter. First, however, it will be appropriate to consider the structure of the coated product.

Referring to FIGS. 6 and 7A, a steel pipe 10 for installation in a pipeline has a water-impermeable corrosion barrier layer 11 bonded to and covering its outer surface. The coating 11 of the present example is preferably a layer of epoxy resin which is fusion bonded to the pipe surface, and which may be applied for example by the method described in our Canadian Pat. No. 965652 dated Apr. 8, 1975. Preferably, a barrier coat 11a is applied over the fusion bonded layer 11 to protect the latter from the concrete which is subsequently applied. In a typical case the pipe may have a wall thickness of 0.2–0.7 inch, the epoxy resin layer being 0.008–0.030 inch. The epoxy coated pipe is encased within a layer of mesh reinforced lightweight concrete 12, from $\frac{1}{2} \times 1\frac{1}{2}$ inches thick forming an impact-resistant outer layer which is permeable to water so as not to shield the cathodic protection of the pipe. The composition of the concrete may be as follows:

| | Parts by Weight | |
|---|---|---|
| | Acceptable by Range | Preferred |
| Lightweight Aggregate (Expanded Slag or Coal Ash, Shale or Slate) | 70–120 | 90 |
| Sand (#13) | 0–30 | 10 |
| Pigment | 0–8 | 4 |
| Portland Cement | 25–45 | 35 |
| Water | 8–16 | 13.5 |

Figure 8:
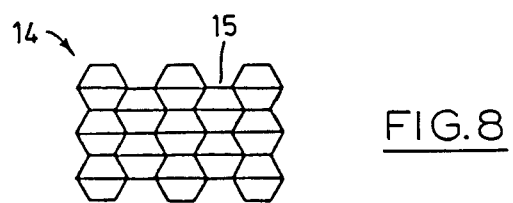
FIG. 8 shows a detail of the mesh reinforcing material.

The concrete layer 12 may be considered to comprise a continuous inner portion 12a, of about half the total thickness of the layer, which covers the epoxy layer 11 and its barrier coat 11a, and a helically slotted outer portion 12b, in which the helical slot 13 which defines the convolutions of the helix extends substantially to the depth of a reinforcing layer 14. The reinforcing layer 14 consists of a strip of fibrous or wire reinforcing material, which is wound helically so as to lie embedded in the concrete layer. FIG. 8 illustrates a detail of the mesh, which in the present example is an 18 gauge wire mesh having 1½ inch hexagonal openings bisected by longitudinally extending wires 15. The wires 15 serve to reduce necking of the mesh when it is subjected to tension during application of the concrete.

As described with reference to FIGS. 1–5, the concrete layer 12 is applied to the pipe by being fed to it as a strip supported on a carrier tape and wrapped helically onto the pipe. Portions of the carrier tape 16 are shown in FIGS. 6 and 7A, wherein one longitudinal edge of the carrier tape extends to the corresponding edge of the wrapped outer concrete portion 12b. The carrier tape 16, which is perforated by a prick wheel 17 when it has been wrapped onto the pipe, so that it will not shield the cathodic protection to be applied to the completed pipeline is typically a 0.010-inch polyethylene tape incorporating an elasticizer, preferably "EVA". This outer tape wrap may become worn and torn during handling of the finished product, but that is of no consequence since its essential function was to maintain the outer spaces formed by the helical slot 13 of the concrete outer portion 12b during application to the pipe and during setting of the concrete so that the spaces would remain discrete in the finished product.

The finished product is therefore a steel pipe 10 having a protective coating consisting of an inner, water-impermeable, corrosion barrier layer 11 bonded to the surface of the pipe, and an outer, water-permeable, concrete layer 12, in the present case a lightweigh concrete layer, having a reinforcing layer 14 of mesh reinforcing material embedded therein.

The concrete layer 12 comprises an inner portion 12a covering the corrosion barrier layer 11, 11a and extending from it to the reinforcing layer 12, and an outer portion 12b. The outer portion 12b is formed with one or more helical slots 13 which extend substantially to the depth of the reinforcing layer. The inner portion 12a of the concrete layer incorporates one or more helically extending zones 18 of reduced compressive strength also extending substantially to the reinforcing layer and radially aligned with the helical slot or slots 13 of the outer portion. Thus the inner portion defines a helical wrap in which adjacent convolutions thereof are separated by the zone or zones 18. These zones may be filled with a compressible material such as foamed plastic or rubber, or as described hereinafter may consist of regions of the concrete cladding material where the material has been pretreated by a strength killing solution. Longitudinal grooves 13', which will form the helical slots 13 of the finished product, are formed in the outer portion 12b, as hereinafter described. Two such slots are shown in the drawing; in practice there will be one or more slots depending on the particular requirements.

This construction, instead of being quite rigid as is normally the case with concrete coated pipe, has a degree of flexibility and permits a limited amount of bending of the pipe so that the pipe can accommodate to irregularities and undulations on the ground or in the trench where it is to be installed, while being adequately protected from damage by rock edges or the like. As shown in FIGS. 7A, 7B and 7C, the effect of bending is to open out the convolutions of the outer wrap on one side of the pipe, up to a limit determined by the closing in of the convolutions on the opposite side of the pipe.

The method of applying the concrete layer to the pipe will now be described, the resinous layer having already been applied to the pipe surface in the manner described in Canadian Pat. No. 965652.

Referring to FIG. 1, the pipe 10 is conveyed and rotated by conventional conveyor means 21, and the pipe is wrapped helically with a strip 22 of coating material advanced at an angle thereto also in a conventional fashion. The strip 22 comprises the polyethylene carrier tape 16 upon which is applied a layer of lightweight concrete 12 having the composition previously described and having at least one continuous strip of reinforcement 14 embedded therein. The reinforcement 14 is in fact a strip of wire mesh 14 whose structure is illustrated in FIG. 8. The concrete 12 has a low water content so that it will set rapidly and have low plasticity. As illustrated in FIGS. 1A and 1B, the strip of concrete 12 comprises a pair of laterally offset inner and outer portions 12a, 12b, by virtue of complementary notches 23 formed along both edges of the concrete strip. The slots 13 and the zones 18 of reduced compressive strength are preformed as will be described with reference to FIG. 2. The wrapping strip 22 can be wrapped uniformly about the pipe 10 in a fashion superior to that previously available by reason of the notches 23 so that, upon wrapping, the strip 22 overlaps with itself at the helical seam to ensure evenness of coating. At the lap the inner portions 12a and the outer portion 12b of the concrete strip merge together and subsequently set to form the continuous portion of the concrete layer covering the resinous layer.

As may also be seen from FIG. 1, the wrapped pipe is coated with a shoe 35 having a vibrator 36 which operates to smooth, compact and increase the density of the coating material and to cause an intermingling of the applied concrete 12 at the helical seam 30. The shoe 35 is preferably made of steel and is curved to conform to the outside diameter of the wrapped pipe. However, each shoe 35 may be used over a range of diameters so a large number of shoes 35 are not required in order to cover a wide range of wrapping applications.

A low coefficient of friction is maintained between the contacting surfaces of the wrapped pipe and the shoe 35 by virtue of the vibration of the shoe 35 and optionally by applying a light spray of water to the exterior of the wrapped pipe.

Figure 2:
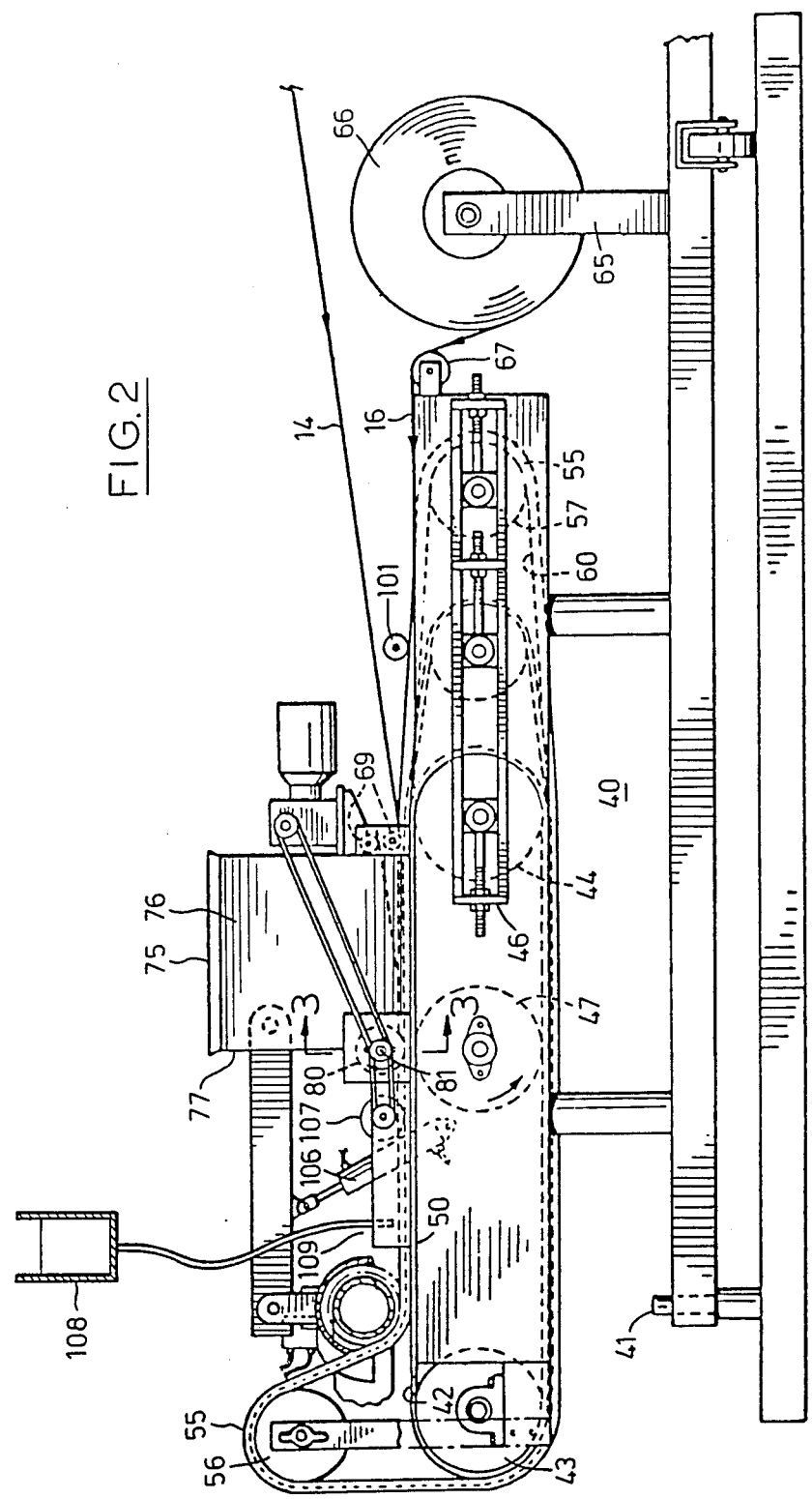
FIG. 2 is a side elevational view of an apparatus used to apply the concrete coating layer to the pipe.
Figure 3:
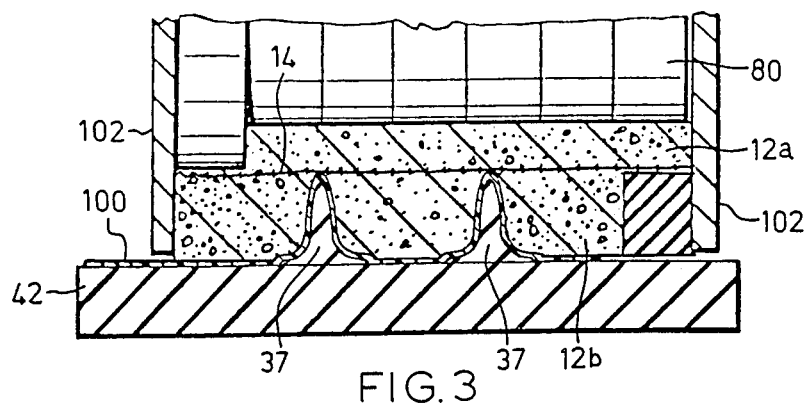
FIG. 3 is a section taken along line 3—3 of FIG. 2.
Figure 5:
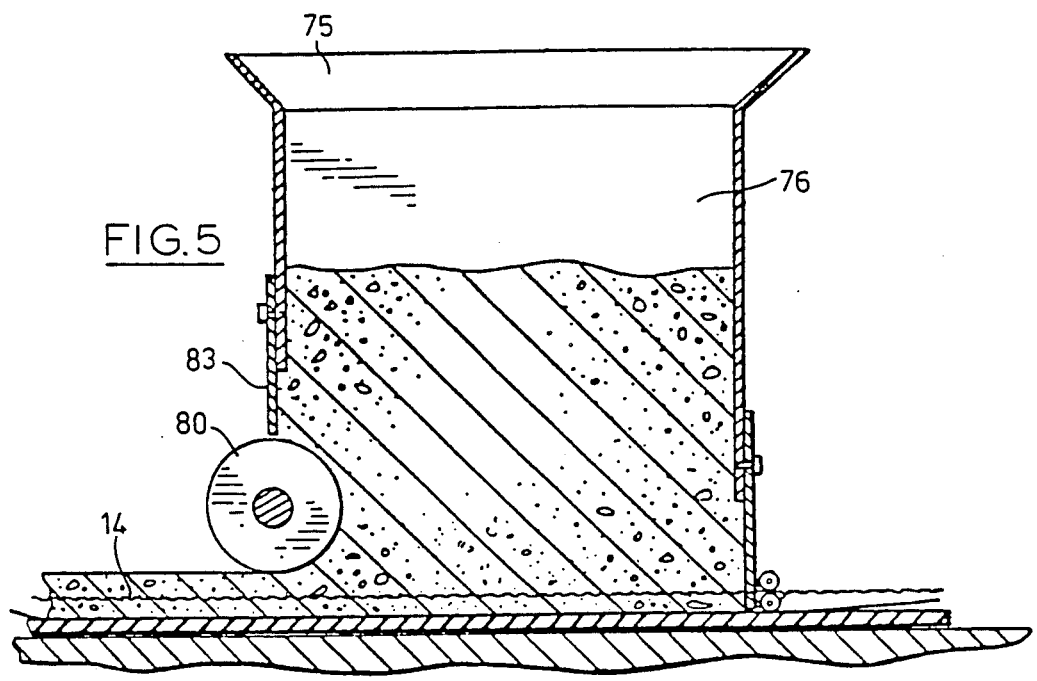
FIG. 5 is a cross section through the hopper of the apparatus showing details of the application of the concrete to a carrier tape.

The preferred pipe wrapping apparatus of invention is shown in FIGS. 2 and 4. The apparatus comprises a frame 40 which is pivotable about a pin 41 so that the angle of application of the coating strip to the pipe 10 can be adjusted as conditions require.

Mounted on the frame 40 is a main endless belt 42 wrapped about a drive pulley 43 at the forward end of the apparatus and a rear pulley 44 which is freely rotatable and is mounted in an adjustable bracket 46 so that the belt 42 can be properly tensioned. A third freely rotatable pulley 47 is located between the drive pulley 43 and the rear pulley 44 for the purpose of supporting the belt 42 in the area beneath a roller 80 used to form the coating strip 12 just prior to wrapping. To support the belt 42 from sagging beneath the weight of the concrete 12, a slider bed 50 is attached to the frame 40 between the pulleys 43 and 44. This slider bed 50 comprises a chamber having a plurality of holes in its top surface through which is forced air to provide a slight air cushion for the belt 42. Attached to the endless belt 42 are longitudinally extending rib like elements 37, shown in the cross-sectional view of FIG. 3, which serve to mold the slots 13 in the outer concrete layer portion 12B as it is conveyed along the pipe.

An endless notching belt 55 is positioned near one edge of the main belt 42 and is supported thereon. The notching belt 55 is guided by means of a forward pulley 56 positioned above the drive pulley 43 and by means of a rearward pulley 57 which is adjustable in the bracket 46 for tensioning of the belt 55.

Located to the rear of the frame 44 is a first reel 65 for carrying a spool of carrier tape 66 which is fed over a guide roller 67 onto the main belt 42. The reel 65 is adjustable laterally (see FIG. 4) so that the tape 16 dispensed from the spool 66 can be lined up properly adjacent the notching belt 55. Guide rollers 101 are used to ensure that the carrier tape 16 conforms to the shape of the molding elements 37 on the endless belt 42. To the rear and above the reel 65, additional reels (not shown) are provided for a spool of reinforcing mesh 14, which are initially positioned over the carrier tape 16 by means of guide rollers 69.

Concrete is applied to the carrier tape 16 through a hopper 75 attached to the frame 40 and located directly over the tape 16. The hopper 75 may have adjustable sides 76 to allow for varying widths for the wrapping strip 22. The front wall 77 of the hopper 75 has an aperture through which the coated strip 22 passes on its way to the pipe 10.

Positioned in the aperture of the hopper 75 is a notch forming roller 80. The roller 80 is located directly over and rotates in a direction opposite to the pulley 47. The roller 80 is mounted in adjustable bearings 81 to accommodate various thicknesses for the coating material 12. The hopper 75 is provided with an adjustable gate 83 (see FIG. 5) located above the roller 80 to close off that upper portion of the aperture 78 not occupied by the roller 80. The roller 80 is driven by a motor 85 mounted on the frame 40.

The operation of the apparatus for forming the coating strip 22 and wrapping the pipe 10 proceeds as follows. The carrier tape 16 is fed from the spool 66 onto the main belt 42 with one edge of the tape 16 abutting the inner notching belt also riding on the main belt 42 (see FIG. 3). The tape 16 is fed through the hopper 75 with the edge away from the notching belt 55 extending beyond the hopper wall 76 so that a margin of uncoated tape 100 (FIG. 3) is provided for overlapping the seam 30 of the wrapped pipe. The tape is formed to the rib like molding elements 37 on the endless belt 42 by means of a roller 101. The mesh reinforcing strip is fed from a reel (not shown) through the guide rollers 69 into the hopper 75 where they are positioned within the layer of coating concrete 12 deposited from the hopper 75 onto the tape 16 by means of the initial guide rollers 69, the notching belt 60 and the roller 80. The notching belt 60 forms notches in the coating material corresponding to its height and width and the roller 80 make a corresponding notch in the concrete strip 12 diagonally opposite from the notch formed by the belt 60.

The zone of reduced compressive strength 18 is formed by wheels 107, which shape the inner portion of the concrete layer 12 to form longitudinally extending slots 108 into which a continuous spray of strength killing solution is introduced from a supply tank 108 via an applicator nozzle 109. The constituency of the solution and the rate of application are such as to ensure the required size and reduction of compressive strength of the zones 18. Typically, the strength killing solution is a high concentration of invert sugar, namely a mixture of glucose and fructose. The solution may have a solution in the range 10% to 20%, preferably 15%. The rate of application of the solution is 10 ml–30 ml, and preferably 15 ml, per linear meter of groove in the concrete. The weakened zone is about 6 mm wide, and as the concrete is applied to the pipe, concrete adjacent the wall of the groove is caused to flow into the slot and form the weakened zone.

The formed wrapping strip 22 proceeds from the roller 80 between the conveyor side guards 102 to the pipe 10 where it is spirally wrapped about it so that the notches formed as aforesaid overlap and interlock. The notching belt 60 supports the concrete strip 12 during approximately the first quarter turn of wrapping so that the integrity of the notches formed by the belt 60 is assured (see FIG. 2). This is achieved by the arrangement of the pulley 56 located at the front of the apparatus to guide the belt 60 during the wrapping portion of the operation.

The wrapped pipe is immediately subjected to a finishing operation wherein the vibrating shoe 35 causes the concrete to flow so as to fill in the seam 30, but not to fill the slots 13 formed in the outer portion of the concrete layer. As shown in FIG. 2, the shoe 35 is preferably mounted pivotally on the wrapped pipe by a cylinder 106.

By wrapping the pipe 10 using the apparatus of the invention, an even and grooved layer of coating material is applied about the pipe 10 and the reinforcing mesh 14 is accurately positioned within the concrete.

To sum up, the method of applying the protective coating to the metal pipe comprises:

(i) forming an inner, water-impermeable corrosion barrier layer bonded to the surface of the pipe, (ii) forming a strip of impact-resistant and penetration-resistant cladding material, such as concrete, having embedded therein a layer of mesh reinforcing material extending along a plane defining inner and outer portions of the strip, (iii) molding one or more longitudinally extending grooves in the outer strip portion, the grooves extending substantially to the depth of the reinforcing layer, (iv) molding one or more longitudinally extending grooves in the inner strip portion substantially to the depth of the reinforcing layer, the grooves being aligned with the grooves formed in the outer layer portion, (v) applying a strength killing solution to the grooves formed in the inner strip portion, thereby to modify the compressive strength of the cladding material adjacent the grooves, (vi) supporting the strip on a carrier tape, (vii) feeding the carrier tape to the pipe under tension, and (viii) compressively wrapping the strip of cladding material onto the pipe with the inner strip portion adjacent the corrosion barrier layer, whereby the grooves formed in the inner strip portion become filled with the weakened cladding material so as to define the helically extending zones of reduced compressive strength.

As shown in FIG. 7A, the concrete cladding 12 is configured as a helical wrap wherein adjacent convolutions of the helical wrap are defined by the open helical slots and the helically extended weakened zones 18, which together break the continuity of the concrete cladding in the direction of the pipe. This discontinuity permits the concrete cladding to accommodate bending of the pipe at the inside of a bend, as shown in FIG. 7B, the weakened zones 18 are compressed while the widths of the slots 13 are reduced. At the outside of a bend, as shown in FIG. 7C, the slots 13 open out and the weakened zones 18 can expand so as to follow the expansion of the metal.

What we claim is:

1. A metallic pipe having a protective coating consisting essentially of an inner, water-impermeable corrosion barrier layer bonded to the pipe surface and an outer, water-permeable layer of impact-resistant and penetration-resistant cladding material, said cladding material having a layer of mesh reinforcing material embedded therein defining inner and outer layer portions, characterized in this, that said outer layer portion is helically slotted substantially to the depth of said reinforcing layer, and said inner layer portion incorporates a helically extending zone of of a material having a lower compressive strength than said cladding material, said helically extending zone extending substantially to the reinforcing layer and being radially aligned with the helical slot of said outer portion throughout its length.

2. A metallic pipe according to claim 1, wherein said inner layer portion defines a helical wrap in which adjacent convolutions thereof are separated by respective convolutions of said helically extending zone.

3. A metallic pipe according to claim 2, wherein the material of said helically extending zone consists of said cladding material pretreated to impart reduced compressive strength to it.

4. A metallic pipe according to claim 3, wherein said outer layer of cladding material is formed as continuous strip of concrete incorporating said layer of mesh reinforcing material, said strip being wound as a continuous helix around said corrosion barrier layer and covering same.

5. A metal pipe according to claim 4, wherein the concrete is a lightweight concrete comprising 70–120 parts by weight lightweight aggregate, 0–30 parts by weight sand, 0–8 parts by weight pigment, 25–45 parts by weight cement, and 8–16 parts by weight water.

6. A metal pipe according to claim 5, wherein the lightweight aggregate is expanded slag.

7. A metal pipe according to claim 1, wherein the corrosion barrier layer is of epoxy resin fusion bonded to the surface of the pipe.

8. A metal pipe according to claim 1, wherein the reinforcing layer comprises a wire mesh in which the mesh openings are bisected by longitudinally extending reinforcing wires.

* * * * *